Patented Mar. 20, 1945

2,372,001

UNITED STATES PATENT OFFICE 2,372,001

PYROLYSIS PRODUCTS OF SOLID POLYMERS OF ETHYLENE

Robert M. Joyce, Jr., Marshallton, Del., assignor to E. I. du Pont de Nemours & Company, Wilmington, Del., a corporation of Delaware No Drawing. Application February 26, 1942, Serial No. 432,504

7 Claims. (Cl. 260—86)

This invention relates to chemical processes and more particularly to the production of unsaturated hydrocarbons.

This invention has as an object a method for obtaining mixtures of unsaturated hydrocarbons of any desired chain length. A further object is the manufacture of new and useful hydrocarbon products and mixtures thereof. Other objects will appear hereinafter.

The above objects are accomplished by the thermal cracking of the high molecular weight polymers obtained by heating ethylene under pressure alone or in admixture with at least one other polymerizable organic compound.

I have found that when above mentioned ethylene polymers are pyrolyzed at high temperatures, new unsaturated hydrocarbon mixtures are obtained. These unsaturated hydrocarbon mixtures are normally solid and may have a degree of unsaturation considerably greater than that which would be expected on the basis of the structure of the starting material.

The polymers of ethylene alone used in the practice of this invention are those described in U. S. Patents 2,153,553 and 2,188,465 and are obtained by heating ethylene under a pressure above 500 atmospheres and preferably above 1000 atmospheres, and at temperatures of from 100° C. to 400° C., and preferably from 150° C. to 250° C. The polymers of ethylene alone as well as the polymers of ethylene with other polymerizable organic compounds can be obtained by contacting ethylene alone or in admixture with another polymerizable organic compound with water and a peroxide compound catalyst, preferably a diacyl peroxide, at temperatures in the range of 40° to 350° C. and at pressure in excess of atmospheric, preferably at pressures in the range of 50 to 1500 atmospheres. The polymers of ethylene with other polymerizable organic compounds can also be made by the process described in U. S. Patent 2,200,429. The polymers of ethylene alone are solids at normal temperatures, corresponding in composition substantially to $(CH_2)_x$, and have molecular weights in excess of 6000. The properties of the polymers of ethylene with other polymerizable organic compounds vary depending upon the nature of the polymerizable organic compound and the composition of the polymer.

A particularly valuable embodiment of this invention is the pyrolysis of polymers obtained by polymerizing a mixture of ethylene and one or more other polymerizable organic compounds by the methods referred to above. The term "ethylene polymers" as used herein is intended therefore to include the polymers obtained by polymerizing ethylene either alone or in admixture with other polymerizable organic compounds.

The conditions under which the cracking of the above defined ethylene polymers is carried out depend upon the nature of the polymer being pyrolized and upon the average chain length desired in the resultant unsaturated hydrocarbon mixture. For example, if it is desired to prepare an unsaturated hydrocarbon mixture whose average molecular weight lies in the neighborhood of 300–400 from a polymer of ethylene alone, a sample of the polymer is placed in a suitable reactor, evacuated to a pressure of about 10 mm. of mercury, and raised to a temperature of about 450°. Under such conditions, the cracking of the ethylene polymer occurs smoothly and continuously to an almost colorless unsaturated solid hydrocarbon grease. No visible charring or tar formation occurs. If a polymer of ethylene with another polymerizable organic compound is the material being pyrolyzed, then somewhat lower temperatures can be used, the exact temperature depending upon the particular material being treated.

The degree of unsaturation of the resulting mixture of hydrocarbons is dependent on the nature of the starting material. For example, in the cracking of the polymers obtained from ethylene alone, double bonds are formed only by the rupture of the carbon-carbon chain; an average of about one double bond appears in the product for each rupture.

Alkyl side chains, such as occur in polymers of ethylene with propylene and isobutylene, represent points of potential rupture in the carbon chain. Hence, in the cracking of such polymers, the molecular weight of the resulting product will be affected not only by the cracking conditions, but to some extent by the relative frequency of occurrence and distribution of alkyl side chains in the polymer molecule.

When a polymer which already contains double bonds, such as an ethylene/butadiene polymer, is cracked, the unsaturation produced in the resulting product represents the sum of the double bonds already present in the polymer and those double bonds formed by rupture of the chain. In the cracking of a polymer containing easily removable side chains, such as acetoxy in ethylene/vinyl acetate polymers and chlorine in ethylene/vinyl chloride polymers, the unsaturation of the resulting product is again represented by the sum of the double bonds produced by the cracking of the chain and the double bonds produced by the intramolecular removal of the simple substituent, such as acetic acid or hydrochloric acid.

It is thus apparent that in the production of unsaturated hydrocarbon mixtures by the process of the present invention, both the degree of unsaturation of the resulting product and the average chain length thereof can be varied independently. Generally the products of this invention are normally greases or solids having a waxy feel like that of paraffin wax, and have a percentage unsaturation of at least 25. Percentage unsaturation is determined by calculation using the equation which follows:

$$U = \frac{\text{Molecular weight} \times \text{Iodine No.}}{254}$$

$U$ = Percentage unsaturation

For a given cracking temperature the average chain length of the pyrolysis products is a function of the pressure at which the cracking is carried out. Thus, the higher the cracking pressure the lower will be the average molecular weight of the products which distill from the reaction mixture.

Distillation of the products from the reaction mixture as they are formed is not essential, but it is often advantageous since this procedure facilitates control of the chain length of the resulting product, and at the same time gives products having a narrower distribution in molecular size. It is not essential that the cracking operation be carried to the point where the products can be distilled even under greatly diminished pressure.

For certain purposes it is often desirable to carry the cracking only a short way, that is, to carry out a relatively slight degradation of the polymer to form a slightly unsaturated hydrocarbon mixture of relatively high molecular weight. Such a modified cracking can be carried out on polymers of ethylene alone or on the products obtained by polymerizing ethylene with other polymerizable organic compounds such as vinyl chloride or vinyl acetate whereby considerable proportions, or nearly all, of the chlorine is removed as hydrogen chloride or the acetoxy side chains as acetic acid, respectively, without degrading the carbon chains to such an extent that a substantial proportion of distillable hydrocarbon products is formed.

As a further modification of the present process, certain catalysts can be employed during the cracking operation to alter the degree of unsaturation of the resulting material. For example, when the cracking of the polymer obtained from ethylene alone is carried out in the presence of nickel-on-kieselguhr catalyst, the resulting hydrocarbon mixture is more unsaturated than in the case when the cracking is carried out in the absence of such a catalyst.

The examples which follow are illustrative of methods for carrying out the invention. In Examples I to IV the polymer is that obtained by polymerizing ethylene alone, and in Examples V to VII the polymer is that obtained by polymerizing a mixture of ethylene with another polymerizable unsaturated organic compound.

Example I

Ethylene polymer having an intrinsic viscosity of 0.74 (0.5% solution in xylene at 85° C.) which corresponds to a molecular weight of about 14,750 is placed in a reactor equipped for distillation and the system is evacuated to a pressure of 10 mm. of mercury. The still pot containing the polymer is then heated with a free flame and the reaction products are allowed to distill into a receiver as they are formed. No charring or tar formation occurs, and essentially all the charge can be cracked and distilled. The product is a soft wax of very light color having an average molecular weight (ebullioscopic in benzene) of 402. It has an iodine number of 53.06, corresponding to a percentage unsaturation of 84. The initial polymer is essentially saturated, having a negligible iodine number.

Example II

Fifty-eight parts by weight of an ethylene polymer having an intrinsic viscosity of 0.58 (0.5% solution in xylene at 85° C.) which corresponds to a molecular weight of about 10,550 is heated in a reactor in a metal bath maintained at 420° C. and a slow current of carbon dioxide is passed through the pyrolyzate, which is under atmospheric pressure. The off gases are conducted through a water-cooled reflux condenser, a dry ice-acetone trap, and are then collected over 50% sodium hydroxide solution. Gas evolution ceases after about 2 hours at this temperature; a total of only 110 parts by volume of alkali insoluble gas is collected. The dry ice-acetone trap contains only about 1 part by weight of a low boiling liquid which is unsaturated to bromine in carbon tetrachloride. The products of the pyrolysis are then distilled under diminished pressure and there is obtained a solid grease, similar to that obtained in Example I. This product, however, has a molecular weight (ebullioscopic in benzene) of only 276, while the iodine number of 61.75 indicates a percentage unsaturation of 67.1. The initial polymer is essentially saturated, having a negligible iodine number.

Example III

Fifty-three parts by weight of an ethylene polymer having an intrinsic viscosity of 0.6 (0.5% solution in xylene) which corresponds to a molecular weight of about 11,550 is placed in a stainless steel bomb of 100 parts by volume internal capacity, and the bomb is pressured with deoxidized nitrogen to 200 lbs./sq. in. The bomb is equipped with a pressure gauge and a bleed-off valve, which latter is connected to a train consisting of a water-cooled condenser with a receiver, a dry ice-acetone trap, and a bubbler.

The bomb is placed in a metal bath and maintained at 420° to 440° C. for 3½ hours. The pressure is maintained at 300 to 500 lbs./sq. in. by manipulation of the bleed-off valve throughout the duration of the experiment. The reaction is stopped after 3½ hours, no pressure increase having occurred for the last hour. The dry ice-acetone trap contains about 8 parts by volume of a low boiling liquid with a pungent odor which is unsaturated to bromine in carbon tetrachloride.

The receiver attached to the water condenser contains 25 parts by weight of a clear liquid with a pungent odor. The bomb itself contains 20 parts by weight of semi-solid residue; this is combined with the contents of the receiver and is distilled through a short column. A considerable quantity of low boiling material which is not condensed in the water condenser distills first. This probably consists of 5 and 6 carbon hydrocarbons. The properties of the materials obtained by fractionation of the remaining liquid are shown in the following table wherein the molecular weight was determined by the ebullioscopic method in benzene.

| Fraction | Boiling point | Molecular weight | Iodine No. | Percentage unsaturation |
|---|---|---|---|---|
| 1 | Under 165° C | 94 | 104.3 | 38.6 |
| 2 | 45°–171° C./10.5 mm | 153 | 53.4 | 32.2 |
| 3 | 140°–248° C./4 mm | 281 | 35 | 38.7 |

It is apparent from the foregoing examples that by conducting the cracking reaction under higher pressures, the average chain length of the resulting product and the degree of unsaturation are considerably decreased.

Example IV

A mixture of 34 parts by weight of an ethylene polymer having an intrinsic viscosity of 0.74 (0.25% solution in xylene at 85° C.) which corresponds to a molecular weight of about 13,450, and 5 parts by weight of nickel-on-kieselguhr catalyst is placed in a flask equipped for distillation and is evacuated to a pressure of 5 mm. of mercury. The flask is then placed in a metal bath which is maintained at about 400° C. for a half hour; the bath is then removed and the product is distilled by heating the flask with a free flame. There is obtained 19 parts by weight of a semisolid grease which has a molecular weight (ebullioscopic in benzene) of 483 and an iodine number of 55.2, corresponding to a percentage unsaturation of 105. The initial polymer is essentially saturated having a negligible iodine number.

Carrying out of the cracking reaction as described above in the presence of the nickel catalyst effects a material increase in the relative degree of unsaturation of the product, without affecting chain length of the cracking product to a noticeable extent.

Example V

Twenty parts by weight of ethylene/propylene polymer having a molecular weight of about 6000 is placed in a flask which is heated in a metal bath at about 450° C. while the reactor is maintained under a total pressure of 5 mm. of mercury. After about a half hour the bath is removed and the product is distilled by heating with a free flame. The distilled product is a light-colored unsaturated grease having a molecular weight of 501 and an iodine number of 53.0, corresponding to a percentage unsaturation of 104.5. The initial polymer is essentially saturated, having a negligible iodine number.

It should be noted that the above product is considerably more unsaturated than the corresponding product prepared by cracking a polymer of ethylene alone.

Example VI

Forty-six and five-tenths parts by weight of an ethylene/butadiene polymer having a molecular weight of about 8060 is placed in a flask which is then evacuated to a pressure of 6 mm. of mercury and heated in a bath which is maintained at 430° to 450° C. The products are allowed to distill as formed, the dark colored fluid distillate has a molecular weight of 274 (ebullioscopic in benzene) and an iodine number of 214.4, corresponding to a percentage unsaturation of 231.3. This experiment illustrates the high degree of unsaturation which may be attained by cracking a polyunsaturated polymer.

Example VII

Thirty-two parts by weight of an ethylene/vinyl chloride polymer containing 32.25% Cl and having a molecular weight of about 24,450 is placed in a distillation flask which is evacuated to 10 mm. of mercury. The flask is then placed in a metal bath maintained at 350° C., at which temperature evolution of HCl takes place rapidly. The residue sets to a hard mass in the flask. The cracking is completed by heating the distillation flask with a free flame, while maintaining the decreased pressure. The product which distills over is a halogen-free hydrocarbon grease having a molecular weight of 321 (ebullioscopic in benzene) and an iodine number of 141.3, corresponding to a percentage unsaturation of 178.6.

Example VIII

Forty-six parts by weight of an ethylene/vinyl acetate polymer having an ethylene:vinyl acetate mole ratio of 8:1 and an intrinsic viscosity 0.63 (0.25% solution in xylene at 85° C.) which corresponds to a molecular weight of about 11,433, is placed in a flask equipped for distillation and is evacuated to 30–40 mm. The temperature is maintained at 340° to 400° C. for a half hour in which time a small amount of acetic acid distills. The cracking is completed by raising the bath temperature to 450° C. and dropping the pressure to 12 mm., allowing the products to distill over as formed. The cracking product, after separation from the acetic acid with which it is admixed, is an oxygen-free hydrocarbon grease having a molecular weight of 455 (ebullioscopic in benzene) and an iodine number of 68.1, corresponding to a percentage unsaturation of 122. The product analyzes C—85.7% and H—13.9%.

As previously indicated, in the practice of this invention, there can be used polymers of ethylene alone or with other polymerizable organic compounds containing the group

such as other aliphatic mono- and diolefins, vinyl esters, vinyl halides, vinylidene halides, acrylic acid and its derivatives, and methacrylic acid and its derivatives.

In general, the cracking temperature employed depends upon the nature of the polymer being pyrolyzed. In pyrolyzing simple ethylene polymers the reaction is carried out at temperatures in excess of 400° C., while in the pyrolysis of polymers of ethylene with other polymerizable organic compounds, temperatures as low as 325° C. can be used. In general, temperatures above 700° C. lead to the extensive production of low molecular weight degradation products and for that reason temperatures below 700° C. are generally used in the practice of this invention. Should it be desired, however, to produce low molecular weight material, a combination of high temperature and high pressure may be successfully employed. In general, to obtain a wax-like product it is preferred to operate in the temperature range 350° to 550° C.

The pressure employed during the cracking operation is likewise a function of the nature of the products which it is desired to prepare. As has been shown, the average chain length of the reaction product decreases as the cracking pressure is increased.

The catalysts that can be employed during the cracking operation include such metal catalysts as nickel, cobalt, platinum and iron. Certain oxide type catalysts are also useful, such as alumina, silica, chromium oxide, and thorium oxide, as are also certain polyvalent metal halides, e. g., zinc chloride, etc.

It is desirable to employ a carrier which may aid in keeping the reaction mixture well agitated during the cracking process and in removing the reaction products therefrom. This carrier may be an inert gas such as carbon dioxide, nitrogen, etc., or it may be an inert material which is in the vapor state at the cracking temperature, such as water, alcohols, and the like.

The present process is advantageously carried out in a continuous manner, as for example by suspending or dissolving the polymer to be cracked in a suitable inert medium which is stable under cracking conditions, such as low molecular weight aliphatic and aromatic hydrocarbon solvents, and passing this solution or suspension through a heated cracking zone at a suitable rate.

The present process possesses several advantages with regard to ease and economy of operation and with regard to the nature of the products obtained. By means of the invention described herein it is possible to vary widely the degree of unsaturation and the average chain length in the resulting products. Almost quantitative amounts of greases, waxes and other valuable unsaturated hydrocarbon products of long chain length are obtained by a clean and smooth cracking process without substantial charring or tar formation. The products obtained by the practice of this invention can be used as such for a wide variety of purposes, such as ingredients in synthetic waxes, polishes, coating compositions, drying oils, etc. Furthermore, by further chemical modification, such as, for example, by condensation with aromatic hydrocarbons, substances can be prepared which are of value in waxes, as petroleum adjuvants, as coating materials, etc.

This condensation can readily be effected using such catalysts as aluminum chloride, boron fluoride, zinc chloride, etc.; it can also be effected using sulfuric acid, thus bringing about simultaneous condensation and sulfonation to produce technically useful acidic products.

These mixtures of unsaturated hydrocarbons can be oxidized to mixtures of carboxylic and hydroxycarboxylic acids or to hydroxylated compounds using nitric acid, chromic acid, permanganate, oxides of nitrogen, or molecular oxygen in the presence of catalysts. The particular products obtained depend upon the conditions employed in the oxidation. These materials are of value in synthetic waxes, for the preparation of water-repellents, as lubricant adjuvants, as rust inhibitors, etc.

The mixture of unsaturated hydrocarbons produced according to this invention can be reacted with sulfur as described in the copending application of J. H. Werntz Serial No. 392,136, filed May 6, 1941, and the products thus obtained can be oxidized to sulfonic acids according to the methods disclosed in the copending application of J. H. Werntz Serial No. 392,137, filed May 6, 1941, or they can be reduced to a mixture of thiols as described in the copending application of W. A. Lazier, F. K. Signaigo, and J. H. Werntz Serial No. 411,336, filed September 18, 1941.

The products produced according to the process of this invention can be hydrogenated to products closely resembling paraffin wax in physical properties. These products can also be chlorinated and the chlorinated product further modified in such a way as to introduce amino, cyano, alkoxy, or aryloxy groups.

The unsaturated products can be hydroxylated to a mixture of polyhydroxy derivatives useful per se or as intermediates in further syntheses. For example, the hydroxylated products can be treated with aldehydes, diisocyanates, chlorosulfonic acid, etc.; these modified products find useful application as plasticizers, softeners, etc.

As many apparently widely different embodiments of this invention may be made without departing from the spirit and scope thereof, it is to be understood that I do not limit myself to the specific embodiments thereof except as defined in the appended claims.

I claim:

1. A process for obtaining from a normally solid and essentially saturated ethylene polymer an unsaturated hydrocarbon product having a percentage unsaturation of at least 25 and having a physical appearance and texture ranging from waxes to greases and of lower molecular weight than said ethylene polymer, said process comprising heating said normally solid ethylene polymer at a temperature of from 400° C. to 700° C., and continuing said heating until said unsaturated hydrocarbon product is obtained.

2. The unsaturated polymeric hydrocarbon product obtained by the process set forth in claim 1.

3. A process for obtaining from a normally solid and essentially saturated ethylene interpolymer an unsaturated hydrocarbon product having a percentage unsaturation of at least 25 and having a physical appearance and texture ranging from waxes to greases and of lower molecular weight than said ethylene interpolymer, said process comprising heating said normally solid interpolymer at a temperature of from 325° C. to 700° C., and continuing said heating until said unsaturated hydrocarbon product is obtained, said normally solid ethylene interpolymer being a polymerized mixture of ethylene and another organic compound containing the group

4. The unsaturated polymeric hydrocarbon product obtained by the process set forth in claim 3.

5. The process set forth in claim 3 in which said interpolymer is that of ethylene and a vinyl ester of a carboxylic acid.

6. The process set forth in claim 3 in which said interpolymer is that of ethylene and isobutylene.

7. The process set forth in claim 3 in which said interpolymer is that of ethylene and vinyl acetate.

ROBERT M. JOYCE, JR.